United States Patent
Kim et al.

(10) Patent No.: US 8,553,029 B2
(45) Date of Patent: Oct. 8, 2013

(54) METHOD AND APPARATUS FOR DETERMINING TWO- OR THREE-DIMENSIONAL DISPLAY MODE OF IMAGE SEQUENCE

(75) Inventors: Yong-tae Kim, Seoul (KR); Sang-moo Park, Uijeongbu-si (KR); Dae-sik Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 618 days.

(21) Appl. No.: 12/408,772

(22) Filed: Mar. 23, 2009

(65) Prior Publication Data

US 2010/0039428 A1    Feb. 18, 2010

(30) Foreign Application Priority Data

Aug. 18, 2008  (KR) .................. 10-2008-0080565

(51) Int. Cl.
  *G06T 15/00*  (2011.01)
(52) U.S. Cl.
  USPC ............................................ 345/419; 348/42
(58) Field of Classification Search
  USPC .......................................... 345/419; 348/42
  See application file for complete search history.

(56) References Cited

U.S. PATENT DOCUMENTS

| | | | |
|---|---|---|---|
| 6,445,833 B1 | 9/2002 | Murata et al. | |
| 2005/0117637 A1 | 6/2005 | Routhier et al. | |
| 2005/0259147 A1* | 11/2005 | Nam et al. | 348/43 |
| 2006/0256136 A1* | 11/2006 | O'Donnell et al. | 345/629 |
| 2006/0268987 A1* | 11/2006 | Ha | 375/240.16 |
| 2008/0231690 A1* | 9/2008 | Woodgate et al. | 348/51 |
| 2009/0112530 A1* | 4/2009 | Vija et al. | 703/2 |

FOREIGN PATENT DOCUMENTS

| | | |
|---|---|---|
| EP | 1 024 672 A1 | 8/2000 |
| EP | 1 737 248 A2 | 12/2006 |
| JP | 3-295393 A | 12/1991 |
| JP | 8-331599 A | 12/1996 |
| KR | 10-2000-0067890 A | 11/2000 |
| KR | 10-2005-0026959 A | 3/2005 |
| KR | 10-2007-0006282 A | 1/2007 |
| KR | 10-2008-0038693 A | 5/2008 |

OTHER PUBLICATIONS

Wolfgang M. Theimer and Hanspeter A. Mallot, "Phase-Based Binocular Vergence Control and Depth Reconstruction Using Active Vision", Nov. 1994, vol. 60, No. 3, pp. 343-358.*
Communication dated Aug. 31, 2012 issued by the European Patent Office in counterpart European Application No. 09808356.1.
Communication dated Jun. 15, 2012 issued by the Mexican Patent Office in corresponding Mexican Application No. MX/a/2011/001629.
Communication, dated Jan. 24, 2013, issued by the State Intellectual Property Office of the People's Republic of China in counterpart Chinese Application No. 200980141106.0.

* cited by examiner

*Primary Examiner* — Maurice L McDowell, Jr.
(74) *Attorney, Agent, or Firm* — Sughrue Mion, PLLC

(57) ABSTRACT

A method of determining a two-dimensional (2D) or three-dimensional (3D) display mode is provided. An image sequence is received. Whether a current image included in the image sequence is a 2D or 3D image is determined. Based on a result of the determination, a 2D or 3D display mode for the image sequence is determined.

23 Claims, 11 Drawing Sheets

METHOD AND APPARATUS FOR DETERMINING TWO- OR THREE-DIMENSIONAL DISPLAY MODE OF IMAGE SEQUENCE

CROSS-REFERENCE TO RELATED PATENT APPLICATION

This application claims priority from Korean Patent Application No. 10-2008-0080565, filed on Aug. 18, 2008, in the Korean Intellectual Property Office, the disclosure of which is incorporated herein in its entirety by reference.

BACKGROUND

1. Field

The invention relates to display of two-dimensional (2D) images and three-dimensional (3D) images.

2. Description of the Related Art

A 2D image sequence includes images captured from one point of view, and a 3D image sequence includes images captured from at least two points of view. In particular, a 3D image sequence including left- and right-viewpoint images can be displayed three-dimensionally on a 3D displaying apparatus that allows an image to be projected on both a left eye and a right eye of a user.

Current 3D displaying apparatuses can display an input 3D image sequence three-dimensionally, and can also display an input 2D image sequence two-dimensionally. Predetermined 3D displaying apparatuses can determine a display mode by extracting a parameter or flag, indicating whether an input image sequence is to be displayed two-dimensionally or three-dimensionally, from the input image sequence.

SUMMARY

The invention provides a method and apparatus for determining whether an image sequence is to be displayed in a two- or three-dimensional (2D or 3D) display mode.

According to an exemplary aspect of the invention, there is provided a method of determining a two-dimensional (2D) or three-dimensional (3D) display mode, the method including: receiving an image sequence; determining whether a current image included in the image sequence is a 2D or 3D image; and determining based on a result of the determination whether a display mode for the image sequence is a 2D or 3D display mode.

The determining whether the current image is a 2D or 3D image may include determining whether the current image is a 2D or 3D image using neighboring images of the current image which are included in the image sequence.

The determining whether the current image is a 2D or 3D image may include: determining characteristic variables of the neighboring images and a characteristic variable of the current image; calculating variations between the characteristic variables of two images from among the neighboring images and the current image; and determining whether the current image is a 2D or 3D image by using a ratio between the variations.

The determining whether the current image is a 2D or 3D image may further include storing the characteristic variables. The calculating of the variations may include calling the stored characteristic variables in order to calculate the variations between the characteristic variables of the two images.

The determining of the characteristic variables may include determining, as the characteristic variables, a first statistic value of a previous image of the current image, a second statistic value of the current image, and a third statistic value of a next image of the current image. The calculating of the variations may include calculating a first difference, which is an absolute value of a difference between the first and second statistic values, a second difference, which is an absolute value of a difference between the second and third statistic values, and a third difference, which is an absolute value of a difference between the first and third statistic values. The determining of whether the current image is a 2D or 3D image may include calculating a ratio of a sum of the first difference and the second difference with respect to the third difference.

In the determining of the first, second, and third statistic values, one of a mean, a variance, and a standard deviation of a predetermined region of each of the images of the image sequence may be used as a statistic value.

The determining of the characteristic variables may include: determining a first disparity vector of the previous image of the current image, a second disparity vector of the current image, and a third disparity vector of the next image of the current image, by using disparities of predetermined regions of the images of the image sequence, when a disparity of a predetermined image indicates a disparity of a predetermined region of the image with respect to a predetermined region of an image previous to the predetermined image; and calculating, as the characteristic variables, a first disparity value associated with the first disparity vector, a second disparity value associated with the second disparity vector, and a third disparity value associated with the third disparity vector. The calculating of the variations may include calculating a first difference being an absolute value of a difference between the first and second disparity values, a second difference being an absolute value of a difference between the second and third disparity values, and a third difference being an absolute value of a difference between the first and third disparity values. The determining of whether the current image is a 2D or 3D image may include calculating a ratio of a sum of the first and second differences with respect to the third difference.

The calculating of the first, second, and third disparity values may include calculating a first disparity value representing a ratio of the number of blocks having negative first disparity vectors from among first disparity vectors of the previous image with respect to the number of blocks having positive first disparity vectors from among the first disparity vectors of the previous image, a second disparity value representing a ratio of the number of blocks having negative second disparity vectors from among second disparity vectors of the current image with respect to the number of blocks having positive second disparity vectors from among the second disparity vectors of the current image, and a third disparity value representing a ratio of the number of blocks having negative third disparity vectors from among third disparity vectors of the next image with respect to the number of blocks having positive third disparity vectors from among the third disparity vectors of the next image.

The determining of whether the current image is a 2D or 3D image may further include determining the current image to be a 3D image when the ratio between the variations is equal to or greater than a threshold value, and the current image to be a 2D image when the ratio between the variations is less than the threshold value.

The determining of whether the display mode for the image sequence is a 2D or 3D display mode may further include converting a display mode of the current image into a display mode that is the same as display modes of the neighboring images if a result of a determination as to whether the current image of the image sequence is a 2D or 3D image is different from a result of a determination as to whether a predetermined number of neighboring images of the image sequence are 2D or 3D images.

If the display mode for the image sequence is determined to be a 2D display mode, the method of determining a 2D or 3D display mode may further include arranging the image sequence in a 2D image format and outputting the image sequence with the 2D image format.

If the display mode for the image sequence is determined to be a 3D display mode, the method of determining a 2D or 3D display mode may further include forming a frame with a left-viewpoint image and a right-viewpoint image corresponding to each other according to at least one of a side-by-side format, a top-bottom format, a vertical line-interleaved format, a horizontal line-interleaved format, a frame sequential format, and a field sequential format, and outputting the frame.

According to another exemplary aspect of the invention, there is provided an apparatus for determining a 2D or 3D display mode, the apparatus including: an image input unit receiving an image sequence; a 2D/3D image determining unit determining whether a current image of the image sequence is a 2D or 3D image; and a 2D/3D display mode determining unit determining whether a display mode of the image sequence is a 2D or 3D display mode, based on a result of the determination as to whether the current image is a 2D or 3D image.

The 2D/3D image determining unit may determine whether the current image is a 2D or 3D image, by using neighboring images of the current image that are included in the image sequence.

The 2D/3D image determining unit may include: a characteristic variable determination unit determining characteristic variables of the neighboring images and a characteristic variable of the current image; a variation calculation unit calculating variations between the characteristic variables of two images from among the neighboring images and the current image; and a variation ratio determination unit determining whether the current image is a 2D or 3D image by using a ratio between the variations.

The apparatus may further include a storage unit storing the characteristic variables. The variation calculation unit may calculate the variations between the characteristic variables of two images from among the neighboring images and the current image, the characteristic variables being stored in the storage unit.

According to another exemplary aspect of the invention, there is provided a computer-readable recording medium having recorded thereon a program for executing the above-described method of determining a 2D or 3D display mode.

BRIEF DESCRIPTION OF THE DRAWINGS

The above and other features of the invention will become more apparent by describing in detail exemplary embodiments thereof with reference to the attached drawings in which.

DETAILED DESCRIPTION

The invention will now be described more fully with reference to the accompanying drawings, in which exemplary embodiments of the invention are shown.

Figure 1:
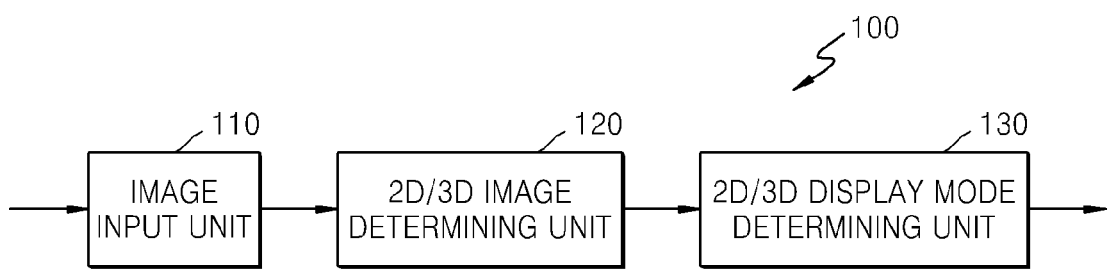
FIG. 1 is a block diagram of a two-dimensional/three-dimensional (2D/3D) display mode determining apparatus according to an exemplary embodiment of the present invention.

FIG. 1 is a block diagram of a two-dimensional/three-dimensional (2D/3D) display mode determining apparatus 100 according to an exemplary embodiment of the invention. Referring to FIG. 1, the 2D/3D display mode determining apparatus 100 includes an image input unit 110, a 2D/3D image determining unit 120, and a 2D/3D display mode determining unit 130.

The image input unit 110 receives an image sequence. The image sequence may be a 2D image sequence or a 3D image sequence. The 3D image sequence may be formed in a frame sequential format in which left-viewpoint frames and right-viewpoint frames corresponding to each other are alternately input.

The 2D/3D image determining unit 120 determines whether a current image of the image sequence received by the image input unit 110 is a 2D or 3D image. Hereinafter, the image sequence received by the image input unit 110 is referred to as a current image sequence. The 2D/3D image determining unit 120 may also determine whether the current image sequence including the current image is a 2D image sequence or a 3D image sequence.

The 2D/3D image determining unit 120 may determine whether the current image included in the current image sequence is a 2D or 3D image by using neighboring images such as a previous image and a next image of the current image.

Figure 11:
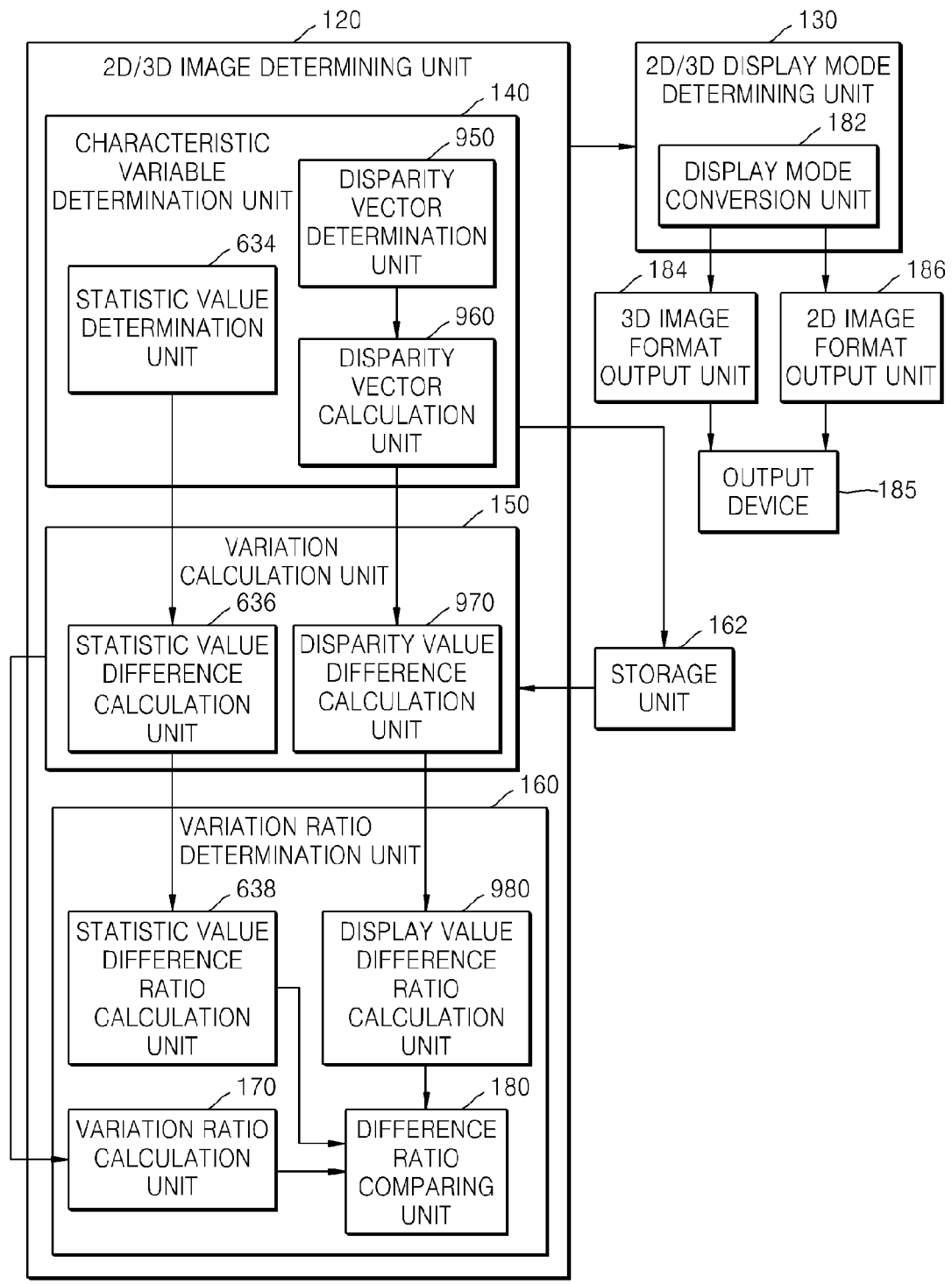
FIG. 11 illustrates a detail of the 2D/3D display mode determining apparatus according to an exemplary embodiment of the present invention.

As shown in FIG. 11, the 2D/3D image determining unit 120 may include a characteristic variable determination unit 140 for determining characteristic variables of the current image and the neighboring images, a variation calculation unit 150 for calculating variations between the characteristic variables of two images from the neighboring images and the current image, and a variation ratio determination unit 160 for determining based on a ratio of the variations whether the current image is a 2D image or a 3D image.

For example, the variations between the characteristic variables of two images may be a difference, an increasing ratio, or a decreasing ratio between the characteristic variables. Differences between the characteristic variables of two images shown in FIGS. 6 and 8 correspond to the variations between the characteristic variables.

The 2D/3D display mode determining apparatus 100 may further include a storage unit 162 for storing the characteristic variables of images which are used to determine a 2D or 3D display mode for the current image sequence. In the exemplary embodiment, the characteristic variable determination unit 140 may determine the characteristic variables of the current image and the neighboring images and output the same to the storage unit 162. The variation calculation unit 150 may receive the characteristic variables of the current image and the neighboring images from the storage unit 162 and calculate the variations between the characteristic variables of two images from the neighboring images and the current image.

The characteristic variable determination unit 140 may use, as the characteristic variable of an image, a statistic value of the pixels included in the image or a numerical value associated with a disparity vector of the image with respect to a previous image. The statistic value may be a mean of the pixels, a variance thereof, or a standard deviation thereof. The numerical value associated with the disparity vector may be a ratio of the number of blocks having negative disparity vectors from the blocks included in the image with respect to the number of blocks having positive disparity vectors from the blocks included in the image.

The characteristic variable determination unit 140 determines a first characteristic variable of a previous image of the current image, a second characteristic variable of the current image, and a third characteristic variable of a next image of the current image.

The variation calculation unit 150 calculates a first variation which is the absolute value of a difference between the first and second characteristic variables, a second variation which is the absolute value of a difference between the second and third characteristic variables, and a third variation which is the absolute value of a difference between the first and third characteristic variables.

The variation ratio determination unit 160 may include a variation ratio calculation unit 170 for calculating a ratio of a sum of the first and second variations with respect to the third variation.

The variation ratio determination unit 160 may include a difference ratio comparing unit 180 for comparing the variation ratio with a predetermined threshold value to determine whether a current image is a 2D or 3D image.

When the ratio of a sum of the first and second variations with respect to the third variation calculated by the variation ratio calculation unit 170 is equal to or greater than a threshold value, the variation ratio determination unit 160 may determine the current image to be a 3D image. On the other hand, when the ratio associated the variations calculated by the variation ratio calculation unit 170 is less than the threshold value, the variation ratio determination unit 160 may determine the current image to be a 2D image.

Exemplary embodiments of the use of a characteristic variable, a variation, and a variation ratio in the 2D/3D image determining unit 120 are described below with reference to FIGS. 5A through 8.

The 2D/3D display mode determining unit 130 determines a 2D display mode or a 3D display mode as a display mode for the current image sequence, based on a result of the determination performed by the 2D/3D image determining unit 120. If it is determined in the 2D/3D image determining unit 120 that the current image sequence is a 3D image sequence, the 2D/3D display mode determining unit 130 may determine the display mode for the current image sequence to be a 3D display mode. On the other hand, if it is determined in the 2D/3D image determining unit 120 that the current image sequence is a 2D image sequence, the 2D/3D display mode determining unit 130 may determine the display mode for the current image sequence to be a 2D display mode.

The 2D/3D display mode determining unit 130 may perform display mode determination in units of frames or in units of image sequences including frames.

The 2D/3D display mode determining unit 130 may include a display mode conversion unit 182 for converting a display mode for the current image into a display mode that is the same as display modes for the neighboring images if a result of the determination performed on the current image by the 2D/3D image determining unit 120 is different from that of the determination performed on the neighboring images.

In a general real-time system, since there is no information about future images, results of determinations of display modes for some of previous frames are reflected on the determination of a display mode for a current frame. Neighboring images, which are compared with a current image in terms of a display mode, are a series of images that belong to a specific section, including the current image, of the entire section of an input image sequence. An exemplary embodiment in which the display mode conversion unit is used in the 2D/3D display mode determining unit 130 is described below with reference to FIG. 9.

The 2D/3D display mode determining apparatus 100 may further include a 3D image format output unit 184 which arranges each of the images determined to be displayed in a 3D display mode in the 2D/3D display mode determining unit 130 in a 3D image format including left-viewpoint image information and right-viewpoint image information corresponding to each other, and which outputs each of the images in the 3D image format to be reproduced on an output device 185.

The 2D/3D display mode determining apparatus 100 may further include a 2D image format output unit 186 which arranges each of the images determined to be displayed in a 2D display mode in the 2D/3D display mode determining unit 130 in a 2D image format, and which outputs each of the images in the 2D image format to be reproduced on the output device 185.

Examples of the 3D image format include a side-by-side format, a top-bottom format, a vertical line-interleaved format, a horizontal line-interleaved format, and a page-flip format that includes a frame sequential format and a field sequential format. The 3D image format is described in greater detail with reference to FIG. 2.

Figure 2:
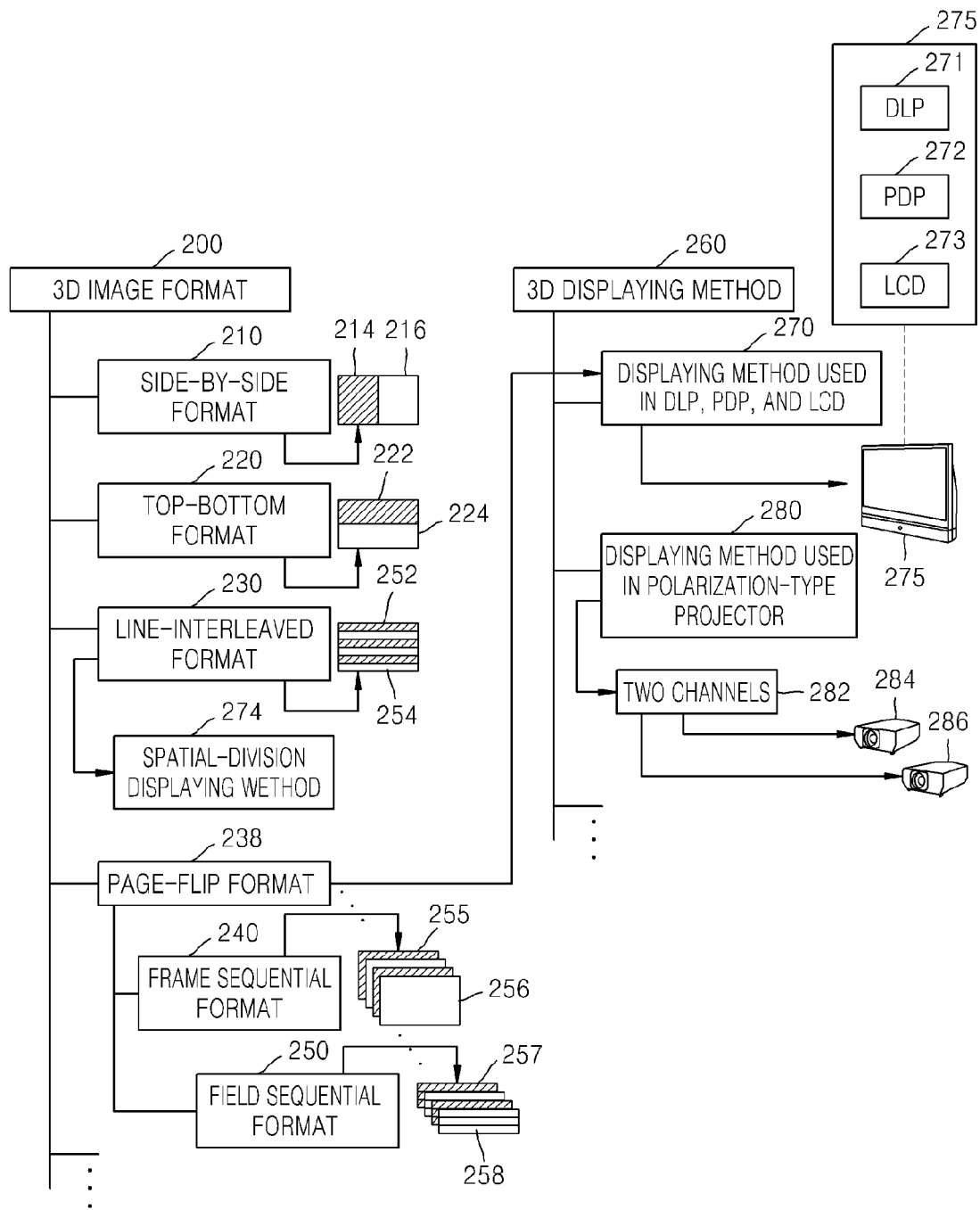
FIG. 2 illustrates a 3D image format for 3D display and a 3D displaying method for 3D display.

FIG. 2 illustrates a 3D image format 200 and a 3D displaying method 260 for use in 3D display. Examples of the 3D image format 200 include a side-by-side format 210, a top-bottom format 220, a line-interleaved format 230, and a page-flip format 238 that includes a frame sequential format 240 and a field sequential format 250.

The side-by-side format 210 forms an image by horizontally halving the resolutions of the left-viewpoint and right-viewpoint images and arranging information about the resolution-halved left-viewpoint image 214 and information about the resolution-halved right-viewpoint image 216 laterally adjacent to each other, i.e., side by side.

The top-bottom format 220 forms an image by vertically halving the resolutions of the left-viewpoint and right-viewpoint images and arranging information about the resolution-halved left-viewpoint image and information about the resolution-halved right-viewpoint image above 222 and below 224 each other.

The line-interleaved format 230 forms an image by alternately arranging left-viewpoint image lines and right-viewpoint image lines. When horizontal lines 252 of left-viewpoint images alternate with horizontal lines 254 of right-viewpoint images, a 3D image in a horizontal line-interleaved format is formed. When vertical lines of left-viewpoint images alternate with vertical lines of right-viewpoint images, a 3D image in a vertical line-interleaved format is formed.

In the page-flip format 238, a complete sheet of a left-viewpoint image and a complete sheet of a right-viewpoint image are alternately arranged according to time. In the frame sequential format 240, left-viewpoint image information 255 and right-viewpoint image information 256 corresponding to each other are alternately arranged in units of frames according to time. In the field sequential format 250, left-viewpoint image fields 257 and right-viewpoint image fields 258 are alternately arranged according to time.

In the page-flip format 238, information about each of a left-viewpoint image and a right-viewpoint image of which the resolutions are not reduced spatially can be used, but the frequencies of the left-viewpoint images and the right-viewpoint images are halved temporally.

Examples of the 3D displaying method 260, using the 3D image format 200, include a displaying method 270 used in a digital light processing (DLP) displaying apparatus 271, a plasma display panel (PDP) 272, and an liquid crystal display (LCD) 273, a spatial-division displaying method 274 using a polarization sheet, and a displaying method 280 used in a polarization-type projector.

According to the displaying method 270 used in a display apparatus 275 including a DLP displaying apparatus 271, a PDP 272, and an LCD 273, a 3D image may be displayed using the page flip format 238 (e.g., the frame sequential format 240 or the field sequential format 250). According to the spatial division displaying method 274, a 3D image may be displayed using a vertical or horizontal line-interleaved format 230. According to the displaying method 280 used in a polarization-type projector, a 3D image received via two channels 282 may be displayed on a first device 284 and a second device 286.

Figure 3:
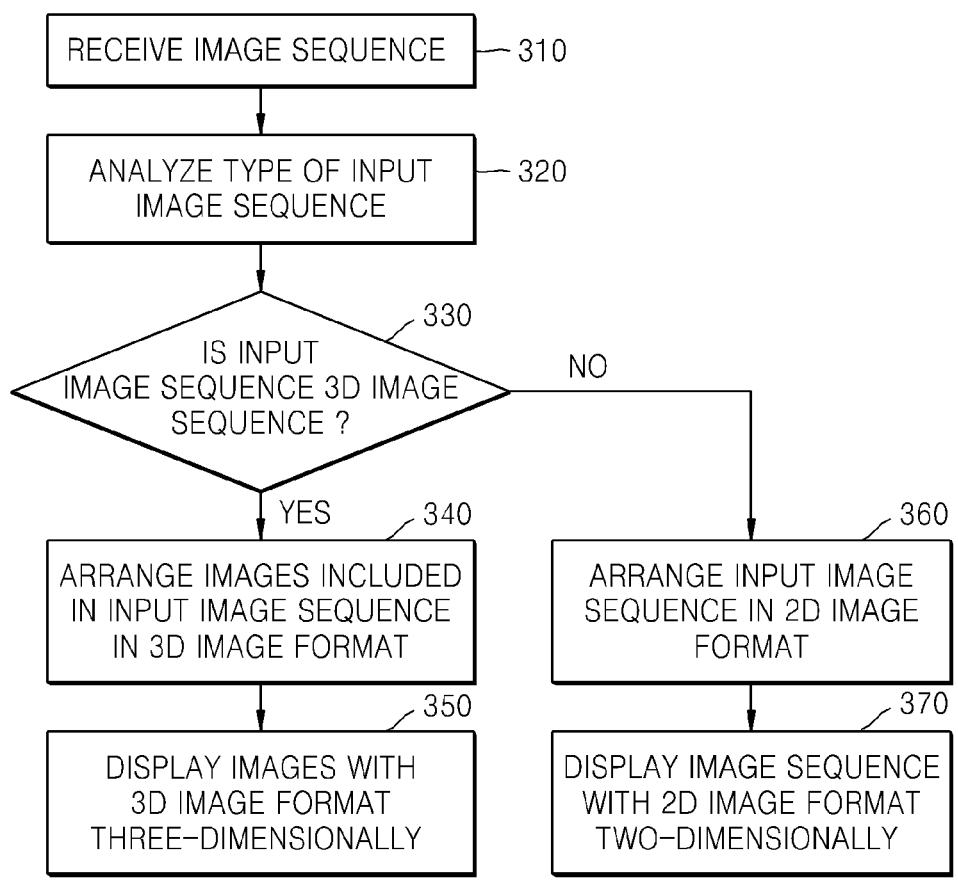
FIG. 3 is a flowchart of a method of determining a 2D or 3D display mode as a display mode for an image sequence, according to an exemplary embodiment of the present invention.

FIG. 3 is a flowchart of a method of determining a 2D or 3D display mode for an image sequence, according to an exemplary embodiment of the invention.

When the image sequence is input in operation 310, the type of the input image sequence is analyzed to determine whether the input image sequence is a 3D image sequence, in operation 320. In operation 330, it is determined based on the result of the determination whether the input image sequence is a 3D image sequence. When it is determined in operation 330 that the input image sequence is a 3D image sequence, the images included in the input image sequence are arranged into a 3D image format, in operation 340. Then, in operation 350, the images with the 3D image format are displayed three-dimensionally on a 3D displaying apparatus and thus users can experience a 3D effect.

On the other hand, when it is determined in operation 330 that the input image sequence is a 2D image sequence, the input image sequence is arranged in a 2D image format, in operation 360. In operation 370, the image sequence in a 2D image format is displayed two-dimensionally on the 3D display apparatus. A method and apparatus for determining whether an input image sequence is a 2D or 3D image sequence by only using information about the images of the input image sequence, according to an exemplary embodiment of the invention, is described with reference to FIGS. 4 through 10.

Figure 4:
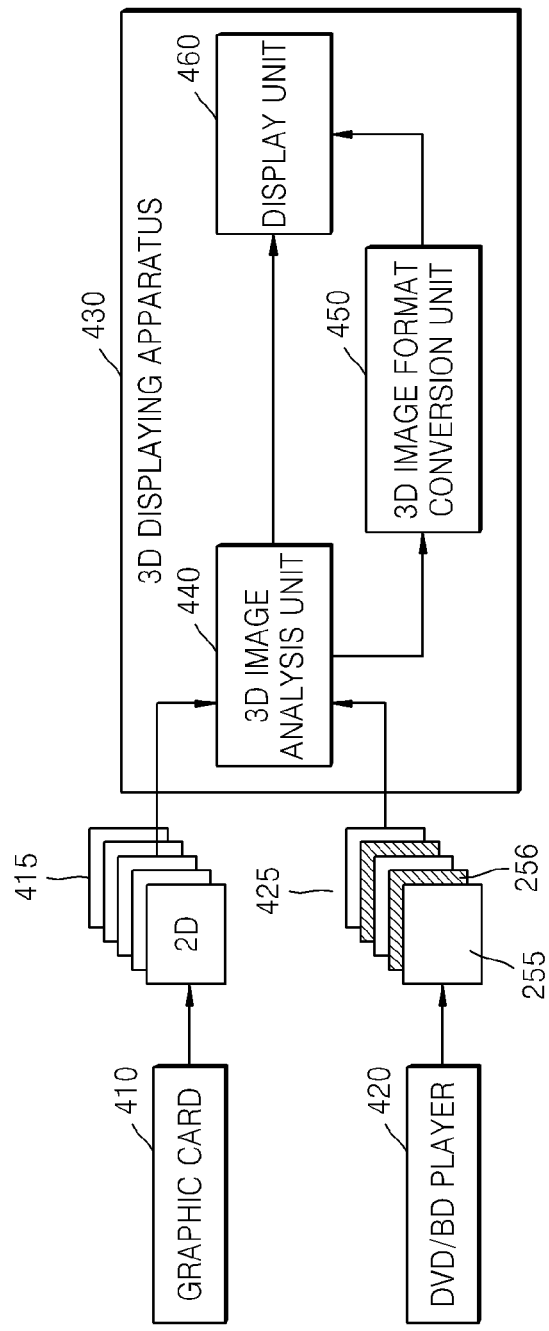
FIG. 4 illustrates a 2D/3D displaying apparatus according to an exemplary embodiment of the present invention.

FIG. 4 illustrates a 2D/3D displaying apparatus 430, according to an exemplary embodiment of the invention.

The 2D/3D displaying apparatus 430 employs a 2D/3D display mode determining method according to an exemplary embodiment of the invention and may receive a 2D image sequence 415 from a graphic card 410 or a 3D image sequence 425 with a frame sequential format from a DVD/blu-ray disk (BD) player 420.

The 2D/3D displaying apparatus 430 includes a 3D image analysis unit 440, a 3D image format conversion unit 450, and a display unit 460. The components of FIG. 4 may be included in an image displaying apparatus such as a BD player, or be included in a 3D image displaying apparatus such as a 3D TV or a 3D monitor.

The 3D image analysis unit 440 analyzes the types of the input 2D and 3D image sequences 415 and 425 by using image information about the input 2D and 3D image sequences 415 and 425 to determine whether the images of the input 2D and 3D image sequences 415 and 425 are 3D images. The 3D image analysis unit 440 outputs an image sequence determined as a 3D image sequence to the 3D image format conversion unit 450 and outputs an image sequence determined as a 2D image sequence directly to the display unit 460.

The 3D image format conversion unit 450 arranges the images of the image sequence determined as a 3D image sequence in a 3D image format and outputs the images with a 3D image format to the display unit 460. The 3D image format conversion unit 450 may arrange the received images in a side-by-side format, a top-bottom format, a vertical/horizontal line-interleaved format, a frame sequential format, or a field sequential format according to a 3D displaying method used in the display unit 460.

The display unit 460 may display an image sequence of a 2D image format two-dimensionally or display an image sequence of a 3D image format three-dimensionally, according to the type of image format.

When comparing the 2D/3D displaying apparatus 430 with the 2D/3D display mode determining apparatus 100, the 3D image analysis unit 440 may function as the 2D/3D image determining unit 120, and the 3D image format conversion unit 450 may function as the 2D/3D display mode determining unit 130.

In methods and apparatuses for determining a 2D or 3D display mode according to exemplary embodiments of the invention, even 3D displaying apparatuses unable to support or recognize parameters or flags for 3D images can still determine whether an image sequence is a 2D or a 3D image sequence by using only information about the pixel values of the image sequence, and display the image sequence in a suitable format.

A transmission end does not need to transmit a flag or the like representing whether an image sequence is a 2D or 3D image sequence, and a reception end does not need to extract a 2D or 3D image flag from a received image sequence. Thus, even when hardware, such as an existing graphic card, and a transmission cable of a display system is used, 3D displaying apparatuses using the 2D or 3D display mode determining methods and apparatuses according to the exemplary embodiments of the invention are able to display 2D or 3D images.

Figure 5A:
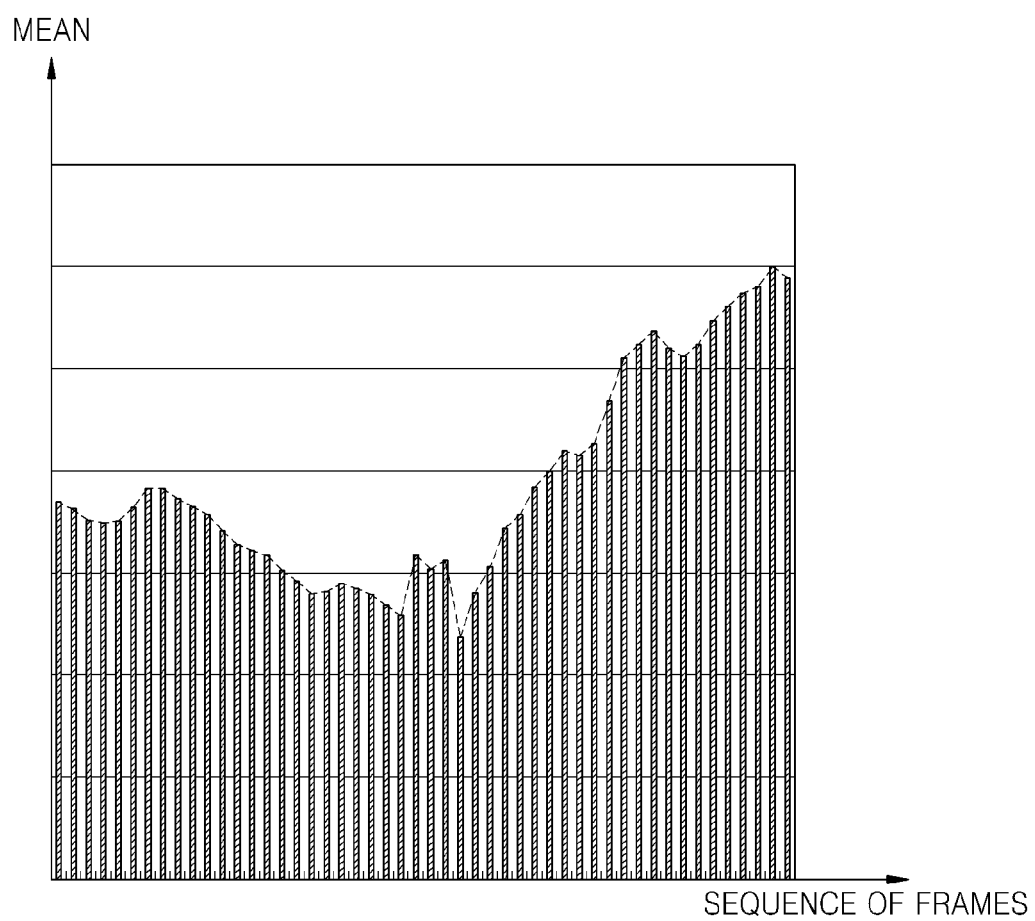
FIG. 5A is a graph showing a distribution of means of frames of a 2D image sequence.
Figure 5B:
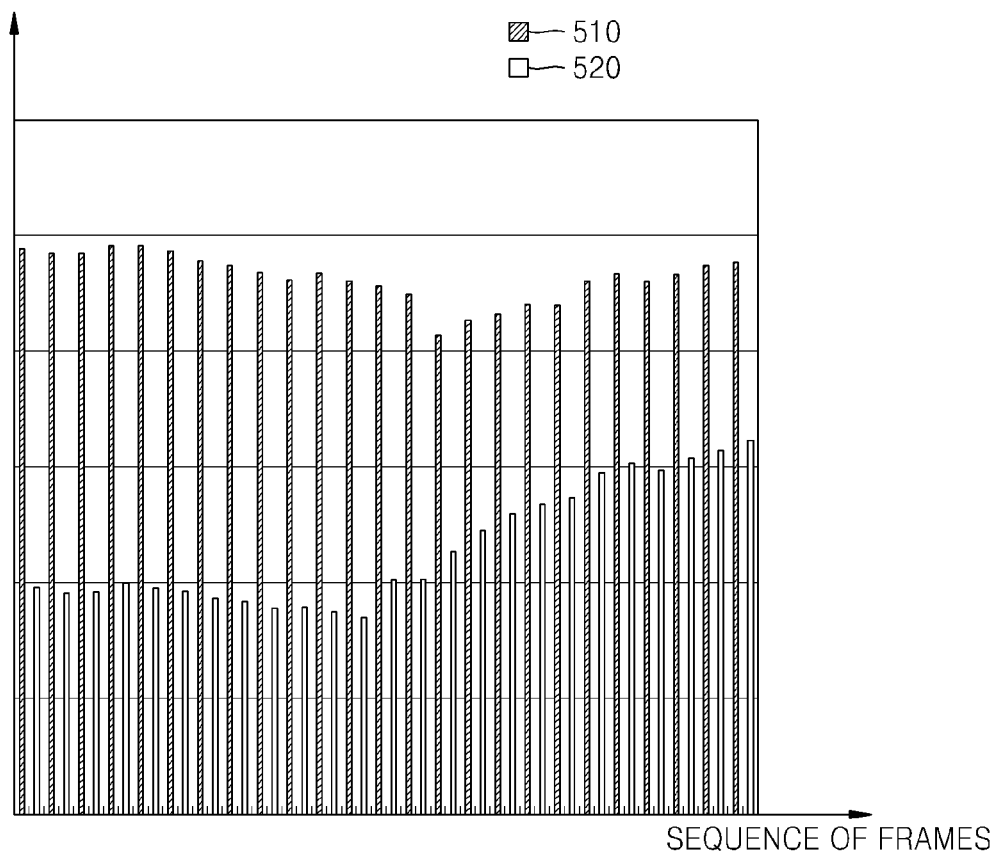
FIG. 5B is a graph showing a distribution of means of frames of a 3D image sequence.

FIG. 5A is a graph showing a distribution of means of frames of a 2D image sequence, and FIG. 5B is a graph showing a distribution of means of frames of a 3D image sequence.

The 2D image sequence shown in FIG. 5A is obtained by arranging images captured from one point of view in units of frames according to time. The 3D image sequence shown in FIG. 5B is obtained by alternately arranging images captured from left and right viewpoints in units of frames according to the time sequence.

Referring to the graph of the 2D image sequence of FIG. 5A, a variation between means of the pixel values of temporally adjacent frames is not large. On the other hand, referring to the graph of the 3D image sequence of FIG. 5B, a variation between means of the pixel values of temporally adjacent frames is substantially large.

Since left-viewpoint frames and right-viewpoint frames that are alternately arranged in the 3D image sequence have pixel values with different distributions, the graph of FIG. 5B shows that a variation between a mean 510 of the pixel values of a left-viewpoint frame and a mean 520 of the pixel values of a right-viewpoint frame immediately previous or next to the left-viewpoint frame is substantially large.

Although FIGS. 5A and 5B show a difference between frame characteristics of a 2D/3D image sequence by illustrating the means of the pixel values of frames, the difference between the frame characteristics of a 2D/3D image sequence may also be checked by using variances, standard deviations, etc., of the pixel values of frames instead of using the means of the pixels values.

The 2D/3D image determining unit 120 of FIG. 1 may determine whether the input image sequence is a 2D or 3D image sequence by using the distribution of means of the pixel values of the frames as shown in FIGS. 5A and 5B. A method in which the 2D/3D image determining unit 120 uses the means of the pixel values of frames as the characteristic variables of the frames is described with reference to FIG. 6.

Figure 6:
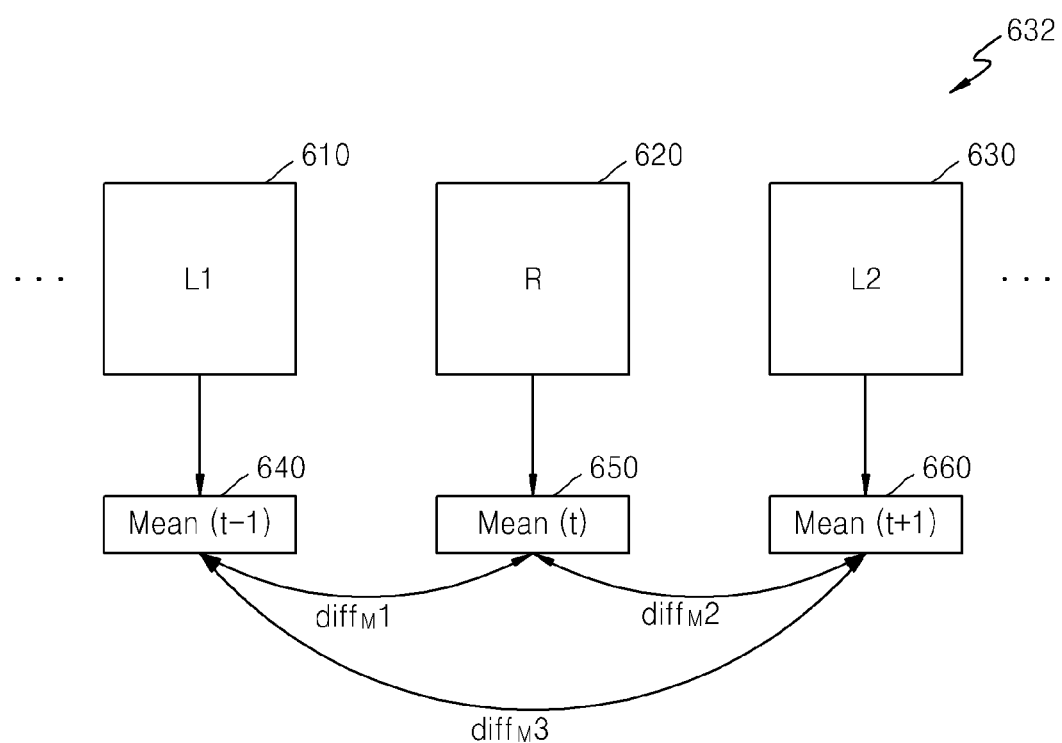
FIG. 6 illustrates relationships between the means of frames which are used to perform 2D/3D image determination, according to an exemplary embodiment of the present invention.

FIG. 6 illustrates relationships between the means of frames which are used to perform 2D/3D image determination, according to an exemplary embodiment of the invention.

A previous frame 610 is a first left-viewpoint image L1 at time t−1, a current frame 620 is a right-viewpoint image R at time t, and a next frame 630 is a second left-viewpoint image L2 at time t+1. The previous, current, and next frames 610, 620, and 630 correspond to an alternate between left and right-viewpoint images L and R. The previous, current, and next frames 610, 620, and 630 are some of the frames included in a 3D image sequence 632.

When a statistic value of the pixel values of each of the frames is used as the characteristic variable of each frame, the characteristic variable determination unit 140 of the 2D/3D image determining unit 120 may include a statistic value determination unit 634 for determining a statistic value of the pixel values of each of the frames, and the variation calculation unit 150 of the 2D/3D image determining unit 120 may include a statistic value difference calculation unit 636 for calculating a difference between the statistic values of adjacent frames. The variation ratio determination unit 160 of the 2D/3D image determining unit 120 may include a statistic value difference ratio calculation unit 638 for calculating a ratio of the differences between adjacent frames.

Although the previous, current, and next frames 610, 620, and 630 alternate between left and right-viewpoint images, as illustrated in FIG. 6, the 2D/3D display mode determining apparatus 100 may determine whether an input image sequence is a 2D or 3D image sequence by using the statistic values of the pixel values of the previous, current, and next frames 610, 620, and 630, without receiving information indicating that left and right-viewpoint image information alternate in the input image sequence. In FIG. 6, a mean among various types of statistic values is used as a characteristic variable of each frame.

The statistic value determination unit 634 determines a first statistic value of the previous frame 610, a second statistic value of the current frame 620, and a third statistic value of the next frame 630.

Referring to FIG. 6, the statistic value determination unit 634 may determine a mean (t−1) 640 of the pixel values of the previous frame 610, a mean (t) 650 of the pixel values of the current frame 620, and a mean (t+1) 660 of the pixel values of the next frame 630.

The statistic value difference calculation unit 636 calculates a first difference between the statistic values of the previous frame 610 and the current frame 620, a second difference between the statistic values of the current frame 620 and the next frame 630, and a third difference between the statistic values of the previous frame 610 and the next frame 630.

The statistic value difference calculation unit 636 calculates a difference between the statistic values of frames by using the absolute value of the difference. The reason why the absolute value of the difference between statistic values is used is to prevent a sum of differences from being offset due to the directions (e.g., a plus value or a minus value) of the values of the difference.

Referring to FIG. 6, the statistic value difference calculation unit 636 may determine a first difference $\text{diff}_M 1$ equal to the absolute value of a difference between a mean (t−1) 640 of the previous frame 610 and a mean (t) 650 of the current frame 620. Similarly, the statistic value difference calculation unit 636 may determine a second difference $\text{diff}_M 2$ equal to the absolute value of a difference between the mean (t) 650 of the current frame 620 and a mean (t+1) 660 of the next frame 630 and a third difference $\text{diff}_M 3$ equal to the absolute value of a difference between the mean (t−1) 640 of the previous frame 610 and the mean (t+1) 660 of the next frame 630.

The statistic value difference ratio calculation unit 638 calculates a ratio of a sum of the first difference and the second difference with respect to the third difference. A statistic value difference ratio $D_M$ is obtained by dividing a sum of the first difference $\text{diff}_M 1$ and the second difference $\text{diff}_M 2$ by the sum of the third difference $\text{diff}_M 3$ and a constant c:

$$D_M = (\text{diff}_M 1 + \text{diff}_M 2)/(\text{diff}_M 3 + c) \quad (1)$$

where the constant c is used to prevent a denominator from being 0.

The difference ratio comparing unit 180 compares the difference ratio $D_M$ with a threshold value to determine whether a current image is a 2D or 3D image. For example, when the threshold value is 1, if a sum of differences between immediately adjacent frames is greater than a difference between adjacent frames having one frame therebetween (i.e., the statistic value difference ratio $D_M > 1$), then a difference between the statistic values of adjacent frames is large. Thus, the variation ratio determination unit 160 may determine that the previous, current, and next frames 610, 620, and 630 are images included in a 3D image sequence.

On the other hand, if the sum of differences between immediately adjacent frames is less than the difference between adjacent frames having one frame therebetween (i.e., the statistic value difference ratio $D_M < 1$), then a difference between the statistic values of adjacent frames is small. Thus, the statistic variation ratio determination unit 160 may determine that the previous, current, and next frames 610, 620, and 630 are images included in a 2D image sequence.

Figure 7:
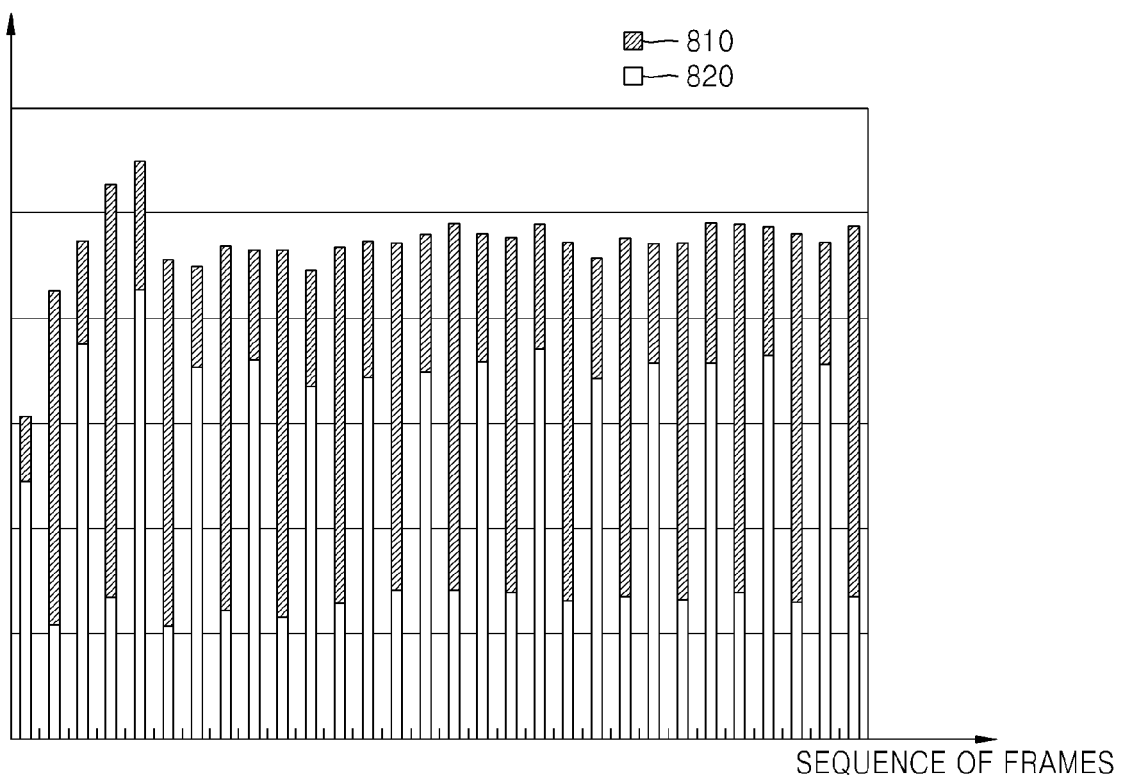
FIG. 7 is a graph showing a distribution of directions of the disparity vectors of each of the frames of a 3D image sequence.

FIG. 7 illustrates a distribution of the directions of the disparity vectors of each of the frames of a 3D image sequence.

The 3D image sequence is obtained by alternately arranging left and right-viewpoint image information according to the sequence of frames. If a current frame is a left-viewpoint frame, previous and next frames are right-viewpoint frames. The disparity vector of a frame may be determined by estimating a disparity of the frame in relation to a previous frame. If a parameter for the disparity vector of an image sequence is provided, the disparity vector of each of the frames of the image sequence may be determined using the parameter for the disparity vector of the image sequence.

It may be determined whether an image sequence is an alternate between left and right-viewpoint images, by using a ratio between a number 810 of blocks of a frame that have disparity vectors in a negative direction and a number 820 of blocks of the frame that have disparity vectors in a positive direction. Referring to the distribution of blocks according to the directions of the disparity vectors of FIG. 7, a ratio between the numbers of blocks according to the directions of disparity vectors of a right-viewpoint frame (i.e., an even-numbered frame) and a ratio between the numbers of blocks according to the directions of disparity vectors of a left-viewpoint frame (i.e., an odd-numbered frame) have a large difference.

The 2D/3D image determining unit 120 may determine whether the input image sequence is a 2D or 3D image sequence, based on the directions of the disparity vectors of each frame as illustrated in FIG. 7, by comparing a ratio between the number of blocks of a predetermined frame that have negative disparity vectors and the number of blocks having positive disparity vectors, with ratios for neighboring frames. A method by which the 2D/3D image determining unit 120 uses the disparity vectors of each frame as the characteristic variable of each frame is described with reference to FIG. 8.

Figure 8:
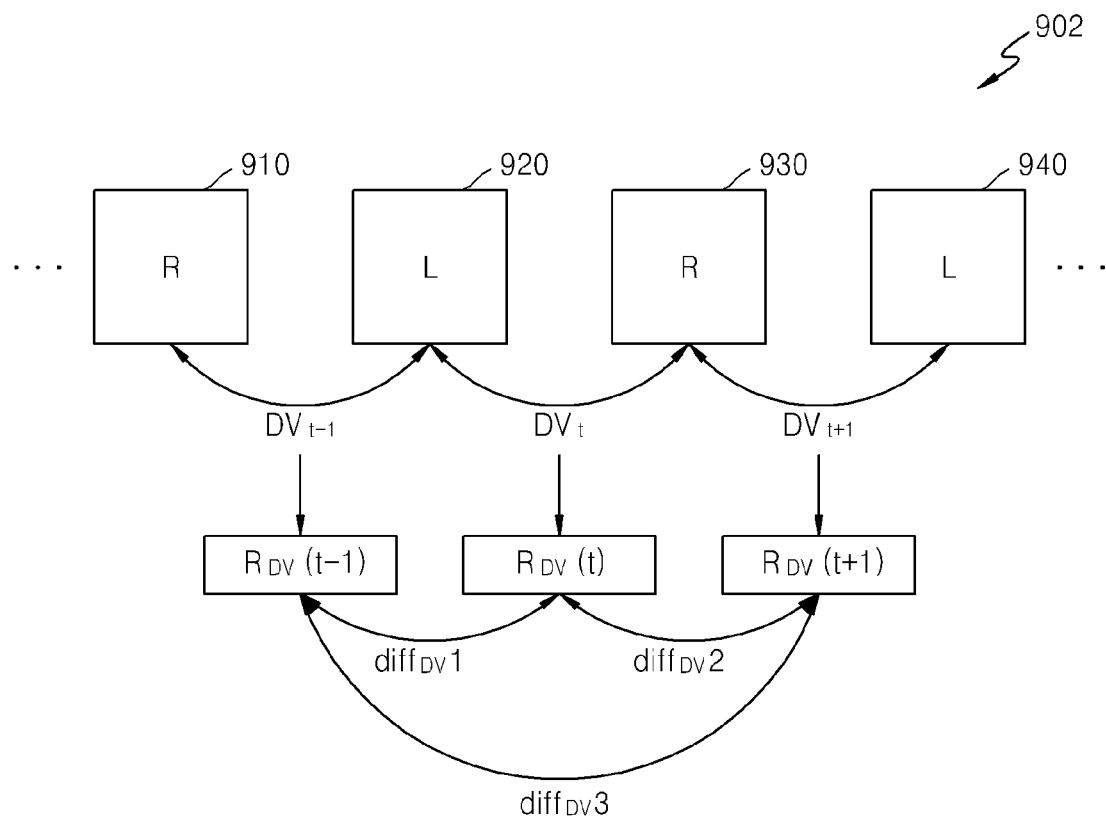
FIG. 8 illustrates a relationship between the disparity vectors of each frame which are used to perform 2D/3D image determination, according to an exemplary embodiment of the present invention.

FIG. 8 illustrates a relationship between the disparity vectors of each frame which are used to perform 2D/3D image determination, according to an exemplary embodiment of the invention.

Referring to FIG. 8, an image sequence 902 is a 3D image sequence obtained by alternately arranging a first right-viewpoint frame 910 at time t−2, a first left-viewpoint frame 920 at time t−1, a second right-viewpoint frame 930 at time t, and a second left-viewpoint frame 940 at time t+1. The second right-viewpoint frame 930 at time t is a current frame.

The 2D/3D display mode determining apparatus 100 may determine whether an input image sequence is a 2D or 3D image sequence by using the directions of the disparity vectors of each of the frames 910, 920, 930, and 940, without receiving information that represents that left and right-viewpoint image information alternate in the input image sequence. The characteristic variable determination unit 140 may use, as the characteristic variable of each frame, a ratio between the numbers of blocks according to the directions of the disparity vectors of each frame.

When a ratio between the numbers of blocks according to the directions of the disparity vectors of each frame is used as the characteristic variable of each frame, the characteristic variable determination unit 140 of the 2D/3D image determining unit 120 may include a disparity vector determination unit 950 for determining the disparity vector of each frame, and a disparity value calculation unit 960 for calculating a disparity value based on the disparity vector of each frame. The variation calculation unit 150 of the 2D/3D image determining unit 120 may include a disparity value difference calculation unit 970 for calculating a difference between disparity values of adjacent frames. The variation ratio determination unit 160 of the 2D/3D image determining unit 120 may include a disparity value difference ratio calculation unit 980 for calculating a ratio of the differences.

The disparity vector determination unit 950 may determine the disparity vector of a predetermined frame by estimating a disparity of a predetermined region of a predetermined frame in relation to a predetermined region of a previous frame of the predetermined frame. Thus, the disparity vector determination unit 950 may use not only the disparity of the entire region of a frame but also the disparity of some regions of the frame. When a parameter for the disparity vector of a frame is input, the disparity vector determination unit 950 may extract a disparity vector value of the frame from the parameter.

The disparity vector determination unit 950 may determine a first disparity vector, which is the disparity vector of a previous frame 920, a second disparity vector, which is the disparity vector of a current frame 930, and a third disparity vector, which is the disparity vector of a next frame 940. Referring to FIG. 8, the disparity vector determination unit 950 may determine a first disparity vector $DV_{t-1}$ of the previous frame 920, a second disparity vector $DV_t$ of the current frame 930, and a third disparity vector $DV_{t+1}$ of the next frame 940.

The disparity value calculation unit 960 calculates a first disparity value representing a ratio between the numbers of blocks of the previous frame 920 according to the directions of the first disparity vector, a second disparity value representing a ratio between the numbers of blocks of the current frame 930 according to the directions of the second disparity vector, and a third disparity value representing a ratio between the numbers of blocks of the next frame 940 according to the directions of the third disparity vector.

Referring to FIG. 8, the disparity value calculation unit 960 may calculate a disparity value $R_{DV}(t-1)$, representing a ratio between the numbers of blocks of the previous frame 920 according to the directions of the first disparity vector $DV_{t-1}$, a disparity value $R_{DV}(t)$, representing a ratio between the numbers of blocks of the current frame 930 according to the directions of the second disparity vector $DV_t$, and a disparity value $R_{DV}(t+1)$, representing a ratio between the numbers of blocks of the next frame 940 according to the directions of the third disparity vector $DV_{t+1}$.

The disparity value calculation unit 960 calculates a disparity value $R_{DV}(n)$ by dividing the number of blocks of an n-th frame having disparity vectors in a negative direction by a sum of 1 and the number of blocks of the n-th frame having disparity vectors in a positive direction:

$$R_{DV}(n) = (\# \text{ of blocks with negative disparity vectors})/(\# \text{ of blocks with positive disparity vectors} + 1) \quad (2)$$

where 1 is added to the denominator to prevent the denominator from being 0.

The disparity value difference calculation unit 970 calculates a first difference between the disparity values of the previous frame 920 and the current frame 930, a second difference between the disparity values of the current frame 930 and the next frame 940, and a third difference between the disparity values of the previous frame 920 and the next frame 940.

Referring to FIG. 8, the disparity value difference calculation unit 970 calculates a first difference $\text{diff}_{DV}1$ between a disparity value $R_{DV}(t-1)$ of the previous frame 920 and a disparity value $R_{DV}(t)$ of the current frame 930, a second difference $\text{diff}_{DV}2$ between a disparity value $R_{DV}(t)$ of the current frame 930 and a disparity value $R_{DV}(t+1)$ of the next frame 940, and a third difference $\text{diff}_{DV}3$ between the disparity value $R_{DV}(t-1)$ of the previous frame 920 and the disparity value $R_{DV}(t+1)$ of the next frame 940.

The disparity value difference ratio calculation unit 980 calculates a ratio of a sum of the first difference and the second difference with respect to the third difference. More specifically, a disparity value difference ratio $D_D$ is obtained by dividing the sum of the first difference $\text{diff}_{DV}1$ and the second difference $\text{diff}_{DV}2$ by a sum of the third difference $\text{diff}_{DV}3$ and a constant c:

$$D_D = (\text{diff}_{DV}1 + \text{diff}_{DV}2)/(\text{diff}_{DV}3 + c) \quad (3)$$

where the constant c is used to prevent the denominator from being 0.

As described above, the difference ratio comparing unit 180 may compare the disparity value difference ratio $D_D$ obtained by the disparity value difference ratio calculation unit 980 with a threshold value to determine whether a current image is a 2D or 3D image.

Figure 9:
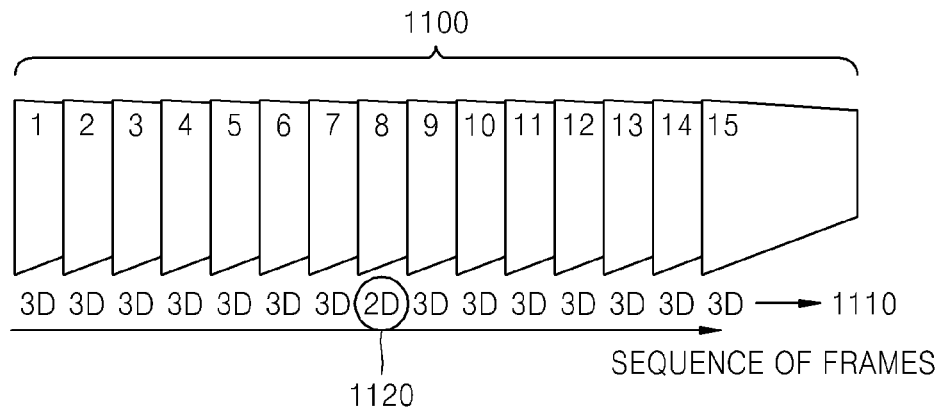
FIG. 9 illustrates a determination of a 2D or 3D display mode for an image sequence, according to an exemplary embodiment of the present invention.

FIG. 9 illustrates a determination of a 2D or 3D display mode for an image sequence 1100, according to an exemplary embodiment of the invention.

It is determined by the 2D/3D image determining unit 120 whether the frames of the image sequence 1100 are 2D or 3D images, thus obtaining a determined image sequence 1110 as a result of the determination. If only a specific frame 1120 of the image sequence 1100 is determined as a 2D (or 3D) image and the remaining frames are determined as 3D (or 2D) images, the 2D/3D display mode determining unit 130 may determine the display mode of the entire image sequence 1100 to be a 3D (or 2D) display mode to secure the unity of the display mode of the image sequence 1100 or increase the reliability of a result of the determination performed by the 2D/3D image determining unit 120.

The 2D/3D display mode determining unit 130 may adjust the range of neighboring frames, which are used in the comparison performed by the 2D/3D image determining unit 120, in consideration of system resources such as the memory of a system.

In some cases, if a display mode for a current image or a current image sequence is determined to be a 3D display mode by the 2D/3D display mode determining unit 130, the current image or the current image sequence needs to be arranged and output in a format suitable for a displaying method used in an image display apparatus capable of performing 3D display. Accordingly, an output unit of the 2D/3D display mode determining apparatus 100 according to another exemplary embodiment of the invention may arrange a 3D image sequence in a suitable 3D image format and output the 3D image sequence with the 3D image format.

If the image sequence is output on a display apparatus that follows a method of displaying an image in a frame sequential format, the 2D/3D display mode determining apparatus 100 may further include a 3D frame sequential format output unit which forms a frame sequential format by alternating left- and right-viewpoint images corresponding to the current image in units of frames and outputs the current image in the frame sequential format.

The 2D/3D display mode determining apparatus 100 may further include a 3D vertical line-interleaved format output unit which arranges the left-viewpoint image and the right-viewpoint image in a vertical line-interleaved format, in which vertical lines of a left-viewpoint image and a right-viewpoint image having horizontally-halved resolutions are alternately arranged, and outputs the left-viewpoint image and the right-viewpoint image in the vertical line-interleaved format.

Figure 10:
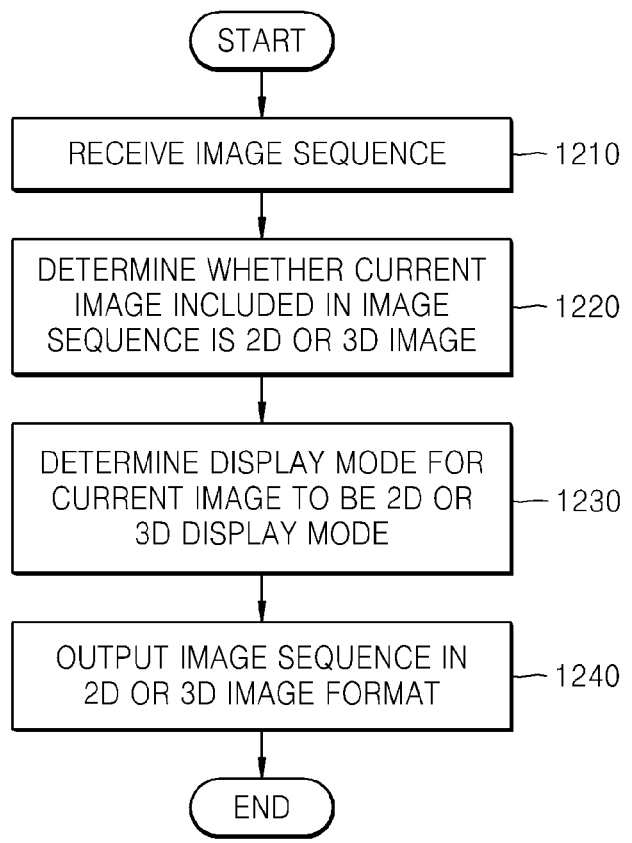
FIG. 10 is a flowchart of a method of determining a 2D or 3D display mode for an image sequence, according to another exemplary embodiment of the present invention.

FIG. 10 is a flowchart of a method of determining a 2D or 3D display mode for an image sequence according to another exemplary embodiment of the invention.

In operation 1210, the image sequence is input. In the exemplary embodiment, even when information representing whether the input image sequence is a 2D or 3D image sequence is not separately input, whether the input image sequence is a 2D or 3D image sequence can be determined using only the image sequence.

In operation 1220, it is determined whether a current image included in the image sequence is a 2D or 3D image. More specifically, the determination may be made in units of frames or in units of image sequences. The determination may be performed using a variation between the characteristic variables of temporally adjacent images or neighboring images. For example, the characteristic variable of each frame may be a statistic value such as a mean, a variance, or a standard deviation of the pixels of each frame, or information associated with the disparity vectors of each frame.

In operation 1230, based on a result of the determination performed in operation 1220, a display mode for the current image is determined to be a 2D or 3D display mode. If it is determined in operation 1220 that the current image is a 2D image, the display mode for the current image is determined to be a 2D display mode. On the other hand, if it is determined in operation 1220 that the current image is a 3D image, the display mode for the current image is determined to be a 3D display mode.

If only a result of the determination on a predetermined image from the images included in a predetermined region of the image sequence is different from that of the determination on the other large number of images, the display mode for the image sequence may be determined to be the same as the display modes for the other large number of images. In a real-time system, a display mode of a current image is determined based on results of the determinations on some of the previous images.

In operation 1240, the image sequence is output in a 2D or 3D image format according to a result of the determination of a display mode performed in operation 1230. Even when the display mode for the image sequence is determined to be a 3D display mode, a 3D image format such as a vertical line-interleaved format or a frame sequential format may be determined based on a 3D display method that a displaying apparatus supports, and the image sequence may be arranged in the 3D image format.

The exemplary embodiments of the invention may be written as computer programs and can be implemented in general-use digital computers that execute the programs using a computer-readable recording medium. Examples of the computer-readable recording medium include magnetic storage media (e.g., ROM, floppy disks, hard disks, etc.), optical recording media (e.g., CD-ROMs, or DVDs).

The exemplary embodiments may also be embodied as computer-readable codes or instructions on a transmission medium. Examples of the transmission medium include carrier waves and other data transmission devices which can carry data over the Internet.

While the invention has been particularly shown and described with reference to exemplary embodiments thereof, it will be understood by those of ordinary skill in the art that various changes in form and details may be made therein without departing from the spirit and scope of the invention as defined by the following claims.

What is claimed is:

1. A method of determining a two-dimensional (2D) or three-dimensional (3D) display mode, the method comprising:
   receiving an image sequence comprising a current image;
   determining whether the current image is a 2D or 3D image based on pixel values of the current image and neighboring images of the current image included in the image sequence;
   determining whether a display mode for the image sequence is the 2D or 3D display mode in accordance with a result of the determining whether the current image is the 2D or 3D image;
   outputting the current image to an output device in a 2D format based on a determination of the 2D display mode; and
   outputting the current image to the output device in a 3D format based on a determination of the 3D display mode.

2. The method of claim 1, wherein the determining whether the current image is a 2D or 3D image further comprises:
   determining characteristic variables of the neighboring images and a characteristic variable of the current image;
   calculating variations between the characteristic variables of two images from the neighboring images and the current image; and
   determining whether the current image is a 2D or 3D image based on a ratio between the variations.

3. The method of claim 2, further comprising:
   storing the determined characteristic variables; and
   retrieving the stored characteristic variables to calculate the variations between the characteristic variables of the two images.

4. The method of claim 2, wherein the neighboring images comprise a previous image and a next image, the method further comprising:
   determining, as the characteristic variables, a first statistic value of the previous image, a second statistic value of the current image, and a third statistic value of the next image;
   calculating a first difference as an absolute value of a difference between the first and second statistic values, a second difference as an absolute value of a difference between the second and third statistic values, and a third difference as an absolute value of a difference between the first and third statistic values; and
   calculating the ratio as a sum of the first difference and the second difference with respect to the third difference.

5. The method of claim 4, wherein in the determining of the first, second, and third statistic values, one of a mean, a variance, and a standard deviation of a predetermined region of each image of the image sequence is used as a statistic value.

6. The method of claim 2, wherein the neighboring images comprise a previous image and a next image, the method further comprising:
   determining a first disparity vector of the previous image, a second disparity vector of the current image, and a third disparity vector of the next image based on disparities of predetermined regions of the images of the image sequence, wherein a disparity of a predetermined image indicates a disparity of a predetermined region of the image with respect to a predetermined region of an image previous to the predetermined image; and
   calculating, as the characteristic variables, a first disparity value associated with the first disparity vector, a second disparity value associated with the second disparity vector, and a third disparity value associated with the third disparity vector;
   calculating a first difference being an absolute value of a difference between the first and second disparity values, a second difference being an absolute value of a difference between the second and third disparity values, and a third difference being an absolute value of a difference between the first and third disparity values; and
   calculating the ratio of a sum of the first and second differences with respect to the third difference.

7. The method of claim 6, wherein the calculating of the first, second, and third disparity values comprises:
   calculating the first disparity value as a ratio of a number of blocks having negative first disparity vectors with respect to a number of blocks having positive first disparity vectors of first disparity vectors of the previous image, the second disparity value as a ratio of a number of blocks having negative second disparity vectors with respect to a number of blocks having positive second disparity vectors of second disparity vectors of the current image, and the third disparity value as a ratio of a number of blocks having negative third disparity vectors with respect to a number of blocks having positive third disparity vectors of third disparity vectors of the next image.

8. The method of claim 2, wherein the determining of whether the current image is a 2D or 3D image further comprises:
   determining the current image to be the 3D image when the ratio between the variations is equal to or greater than a threshold value, and the current image to be the 2D image when the ratio between the variations is less than the threshold value.

9. The method of claim 1, wherein the determining of whether the display mode for the image sequence is a 2D or 3D display mode comprises:
   converting a display mode of the current image into a display mode that is the same as display modes of the neighboring images if a result of a determination whether the current image of the image sequence is a 2D or 3D image is different from a result of a determination whether a predetermined number of the neighboring images of the image sequence are 2D or 3D images.

10. The method of claim 1 further comprising:
    arranging the image sequence in the 2D image format and outputting the image sequence with the 2D image format.

11. The method of claim 1 further comprising:
    forming a frame with a left-viewpoint image and a right-viewpoint image corresponding to each other according to at least one of a side-by-side format, a top-bottom format, a vertical line-interleaved format, a horizontal line-interleaved format, a frame sequential format, and a field sequential format if the display mode for the image sequence is determined to be the 3D display mode, and outputting the formed frame.

12. An apparatus for determining a 2D or 3D display mode, the apparatus comprising:
    an image input unit which receives an image sequence comprising a current image;
    a 2D/3D image determining unit which determines whether the current image is a 2D or 3D image based on pixel values of the current image and neighboring images of the current image included in the image sequence; and a 2D/3D display mode determining unit which determines whether a display mode of the image sequence is the 2D or 3D display mode in accordance with a result of the determining whether the current image is the 2D or 3D image; and a display unit which displays the image current image in a 2D format or in a 3D format, in accordance with the 2D display mode or the 3D display mode, respectively, determined by the 2D/3D display mode determining unit.

13. The apparatus of claim 12, wherein the 2D/3D image determining unit comprises:

a characteristic variable determination unit which determines characteristic variables of the neighboring images and a characteristic variable of the current image;

a variation calculation unit which calculates variations between the characteristic variables of two images from the neighboring images and the current image; and a variation ratio determination unit which determines whether the current image is the 2D or 3D image based on a ratio between the variations.

14. The apparatus of claim 13, further comprising:
a storage unit which stores the calculated characteristic variables.

15. The apparatus of claim 13, wherein the neighboring images comprise a previous image and a next image and wherein the 2D/3D image determining unit further comprises:

a statistic value determination unit which determines, as the characteristic variables, a first statistic value of the previous image, a second statistic value of the current image, and a third statistic value of the next image;

a statistic value difference calculation unit which calculates a first difference as an absolute value of a difference between the first and second statistic values, a second difference as an absolute value of a difference between the second and third statistic values, and a third difference as an absolute value of a difference between the first and third statistic values; and a statistic value difference ratio calculation unit which calculates the ratio as a sum of the first difference and the second difference with respect to the third difference.

16. The apparatus of claim 15, wherein the statistic value determination unit determines, as the statistic value, one of a mean, a variance, and a standard deviation of a predetermined region of each of the images of the image sequence.

17. The apparatus of claim 13, wherein the neighboring images comprise a previous image and a next image and wherein the 2D/3D image determining unit further comprises:

a disparity vector determination unit which determines a first disparity vector of the previous image, a second disparity vector of the current image, and a third disparity vector of the next image based on disparities of predetermined regions of the images of the image sequence, wherein a disparity of a predetermined image indicates a disparity of a predetermined region of the image with respect to a predetermined region of an image previous to the predetermined image;

a disparity value calculation unit which calculates, as the characteristic variables, a first disparity value associated with the first disparity vector, a second disparity value associated with the second disparity vector, and a third disparity value associated with the third disparity vector;

a disparity value difference calculation unit which calculates a first difference being an absolute value of a difference between the first and second disparity values, a second difference being an absolute value of a difference between the second and third disparity values, and a third difference being an absolute value of a difference between the first and third disparity values; and a disparity value difference ratio calculation unit which calculates the ratio of a sum of the first and second differences with respect to the third difference.

18. The apparatus of claim 17, wherein the disparity value calculation unit calculates:

the first disparity value as a ratio of a number of blocks having negative first disparity vectors with respect to a number of blocks having positive first disparity vectors of first disparity vectors of the previous image, the second disparity value as a ratio of a number of blocks having negative second disparity vectors with respect to a number of blocks having positive second disparity vectors of second disparity vectors of the current image, and the third disparity value as a ratio of a number of blocks having negative third disparity vectors with respect to a number of blocks having positive third disparity vectors of third disparity vectors of the next image.

19. The apparatus of claim 13, wherein the variation ratio determination unit further comprises:

a variation ratio comparing unit which determines the current image to be a 3D image when the ratio between the variations is equal to or greater than a threshold value, and the current image to be a 2D image when the ratio between the variations is less than the threshold value.

20. The apparatus of claim 12, wherein the 2D/3D display mode determining unit further comprises:

a display mode conversion unit which converts a display mode of the current image into a display mode that is the same as display modes of the neighboring images if a result of a determination whether the current image of the image sequence is a 2D or 3D image is different from a result of a determination whether a predetermined number of the neighboring images of the image sequence are 2D or 3D images.

21. The apparatus of claim 12 further comprising:
a 2D image format output unit which arranges the image sequence in the 2D image format and outputs the image sequence with the 2D image format if the display mode for the image sequence is determined to be the 2D display mode.

22. The apparatus of claim 12 further comprising:
a 3D image format output unit which forms a frame with a left-viewpoint image and a right-viewpoint image corresponding to each other according to at least one of a side-by-side format, a top-bottom format, a vertical line-interleaved format, a horizontal line-interleaved format, a frame sequential format, and a field sequential format if the display mode for the image sequence is determined to be the 3D display mode, and outputs the formed frame.

23. A non-transitory computer-readable recording medium having recorded thereon a program, which program, when executed by a computer, causes the computer to execute a method of determining a 2D or 3D display mode, the method comprising:

receiving an image sequence comprising a current image;

determining whether the current image is a 2D or 3D image based on pixel values of the current image and neighboring images of the current image included in the image sequence; and determining whether a display mode for the image sequence is the 2D or 3D display mode in accordance with a result of the determining whether the current image is the 2D or 3D image;

outputting the current image to an output device in a 2D format based on a determination of the 2D display mode; and outputting the current image to the output device in a 3D format based on a determination of the 3D display mode.

* * * * *